Feb. 18, 1964 L. O. PERSINGER ETAL 3,121,386
BARBECUE ASSEMBLY
Filed Nov. 28, 1958 4 Sheets-Sheet 3
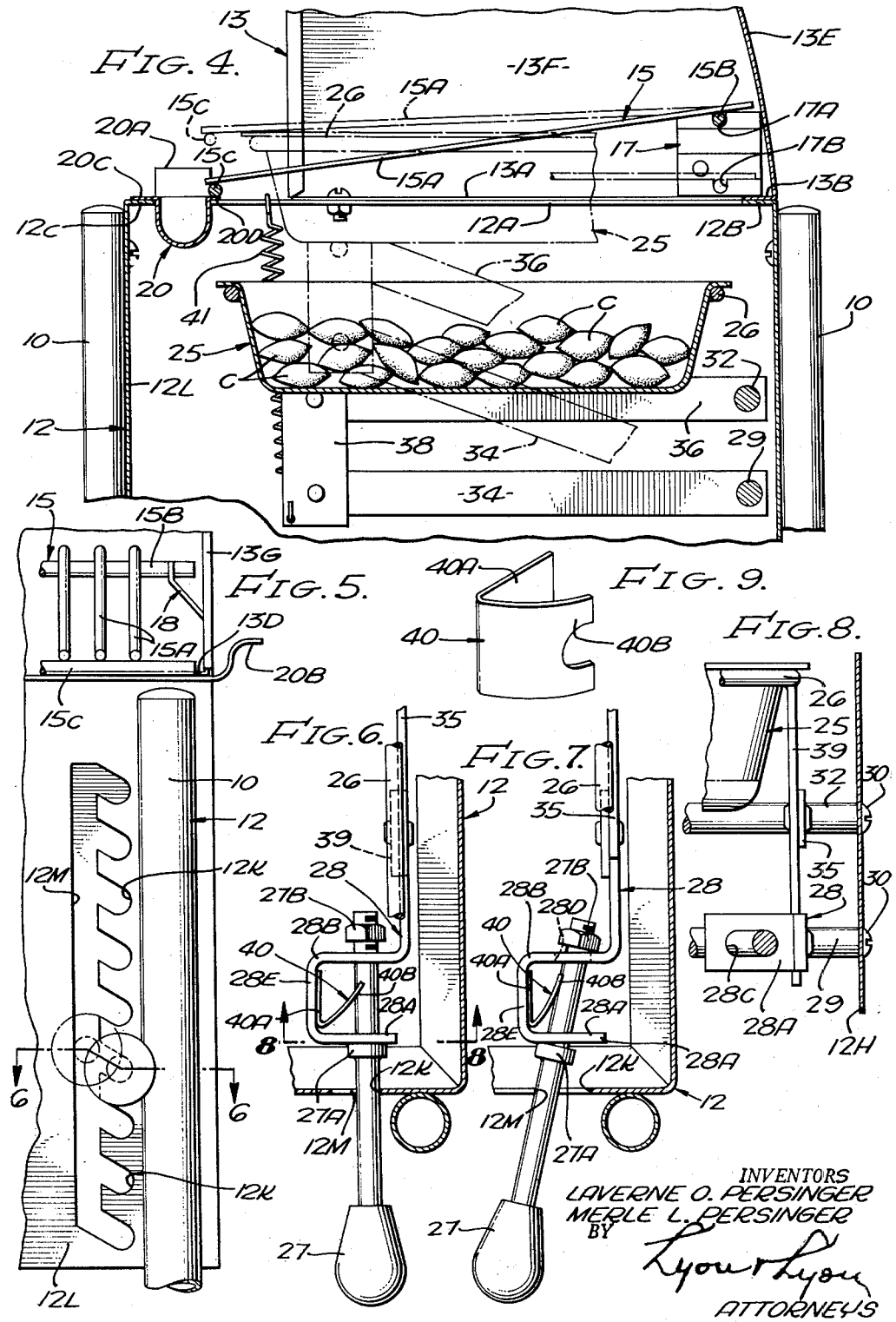
INVENTORS
LAVERNE O. PERSINGER
MERLE L. PERSINGER
BY
Lyon & Lyon
ATTORNEYS Feb. 18, 1964 L. O. PERSINGER ETAL 3,121,386
BARBECUE ASSEMBLY
Filed Nov. 28, 1958 4 Sheets-Sheet 4

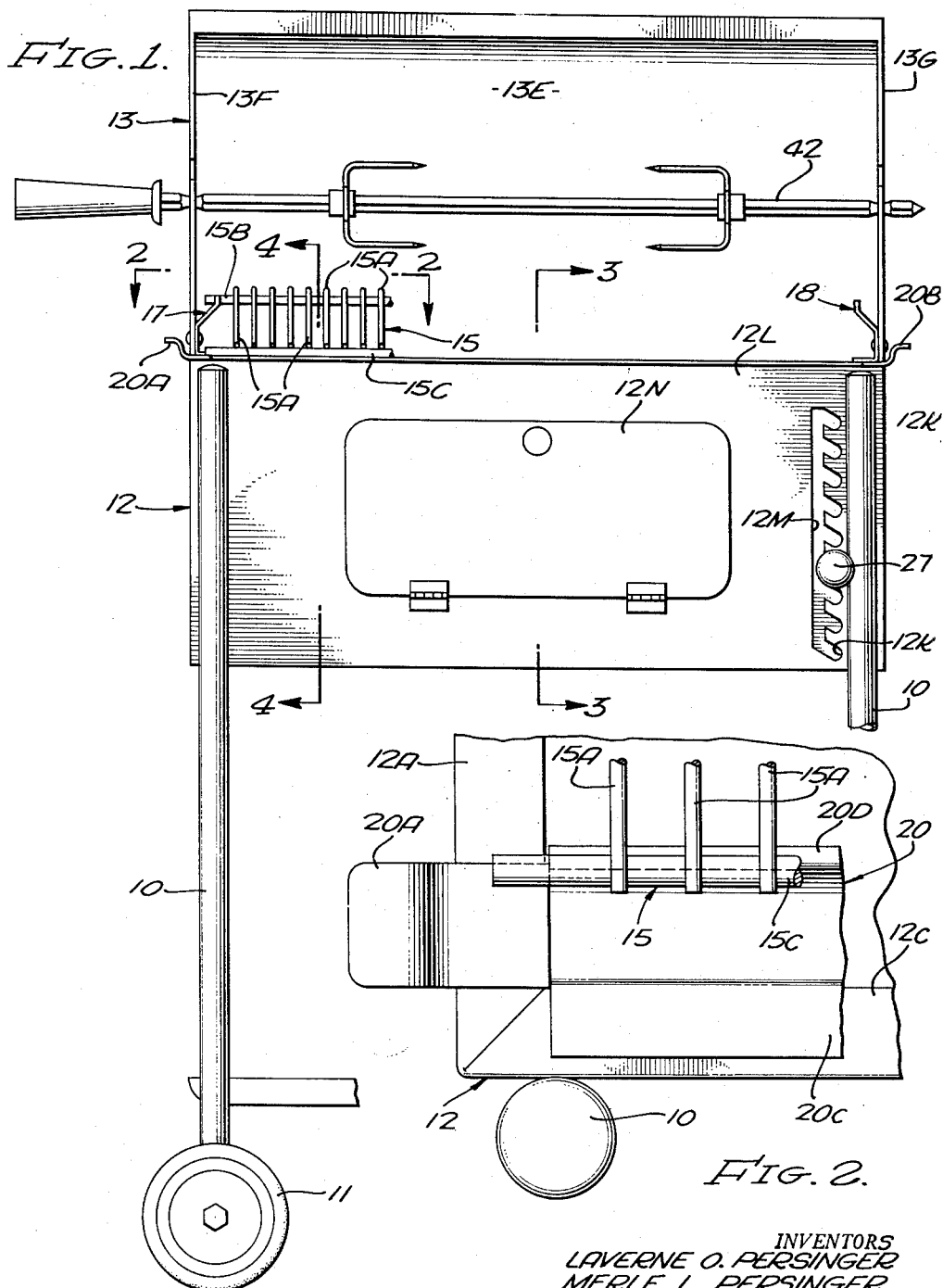

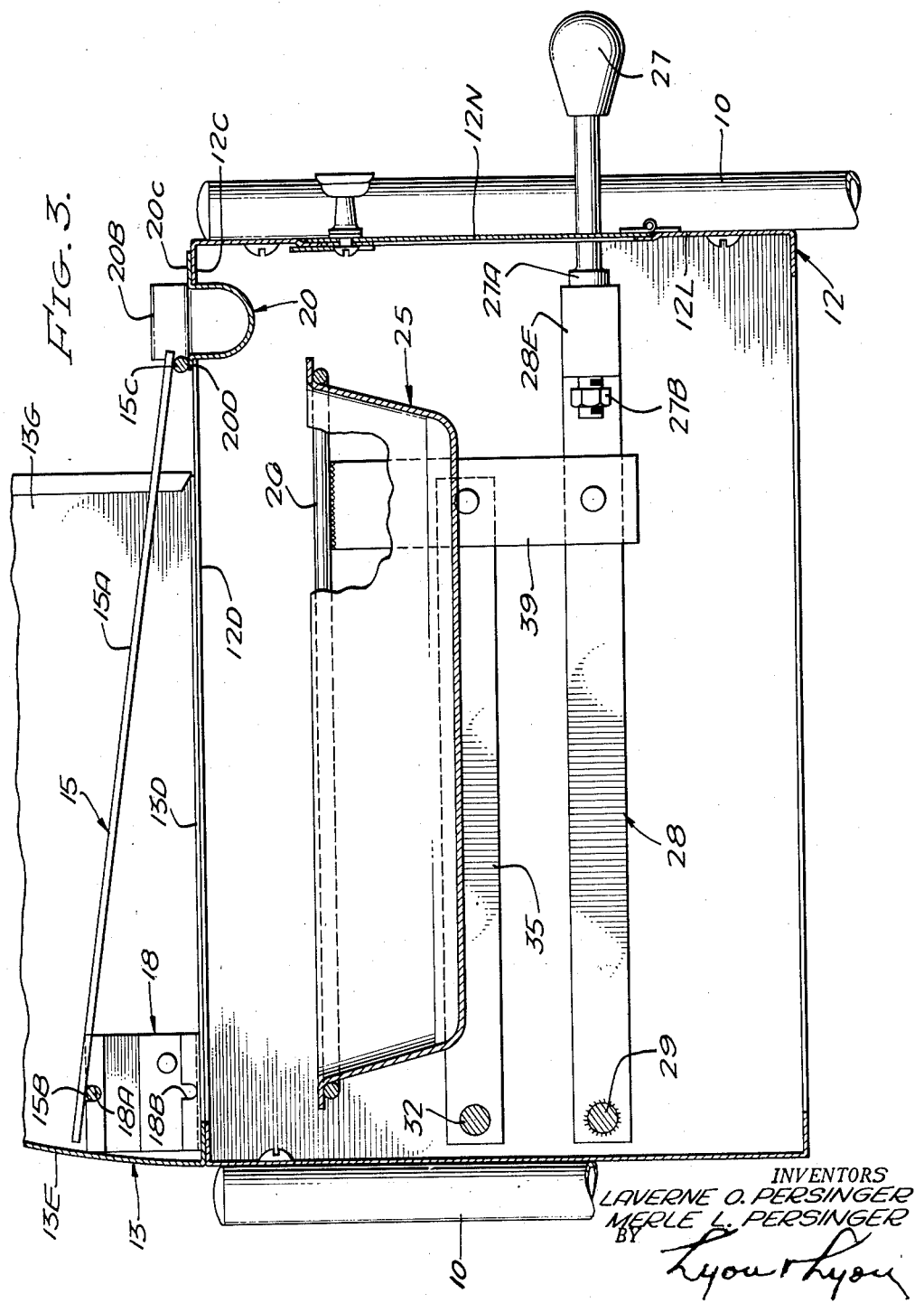

INVENTORS
LAVERNE O. PERSINGER
MERLE L. PERSINGER
BY
Lyon & Lyon
ATTORNEYS

United States Patent Office 3,121,386
Patented Feb. 18, 1964

3,121,386
BARBECUE ASSEMBLY
Laverne O. Persinger, Burbank, and Merle L. Persinger, Glendale, Calif., assignors to Big Boy Manufacturing Company, a division of Seidelhuber Steel Rolling Mills Corporation, Burbank, Calif., a corporation of Washington
Filed Nov. 28, 1958, Ser. No. 776,889
2 Claims. (Cl. 99—443)

The present invention relates to the construction of a simple, inexpensive barbecue in which the firebox may be conveniently raised and lowered with respect to the barbecue grill and in which means are incorporated for maintaining the grill in either a horizontal position or in an inclined position, and in which means are provided for collecting greases gravitating from the inclined grill.

It is therefore an object of the present invention to provide an improved inexpensive barbecue having the features indicated above.

Another object of the present invention is to provide a simple raising and lifting mechanism for the firebox without the necessity of using rotatable cranks.

Another object of the present invention is to provide improved adjustment mechanism for the firebox which is simple and easy to operate.

Another object of the present invention is to provide a barbecue of this type in which grease-collecting means are mounted in a novel manner with respect to a tiltable grill.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in front elevation of a portion of a barbecue embodying features of the present invention.

FIGURES 2, 3 and 4 are sectional views taken generally on corresponding lines 2—2, 3—3 and 4—4 in FIGURE 1.

FIGURE 5 shows in enlarged form a portion of the barbecue illustrated in FIGURE 1 and includes additional details of the same.

FIGURE 6 is a sectional view taken substantially on the line 6—6 of FIGURE 5.

FIGURE 7 is a view like FIGURE 6 but shows the manually operated member in a different position.

FIGURE 8 is a view taken generally along the line 8—8 of FIGURE 6.

FIGURE 9 is a perspective view of the spring element shown also in FIGURES 6 and 7.

Figure 10:
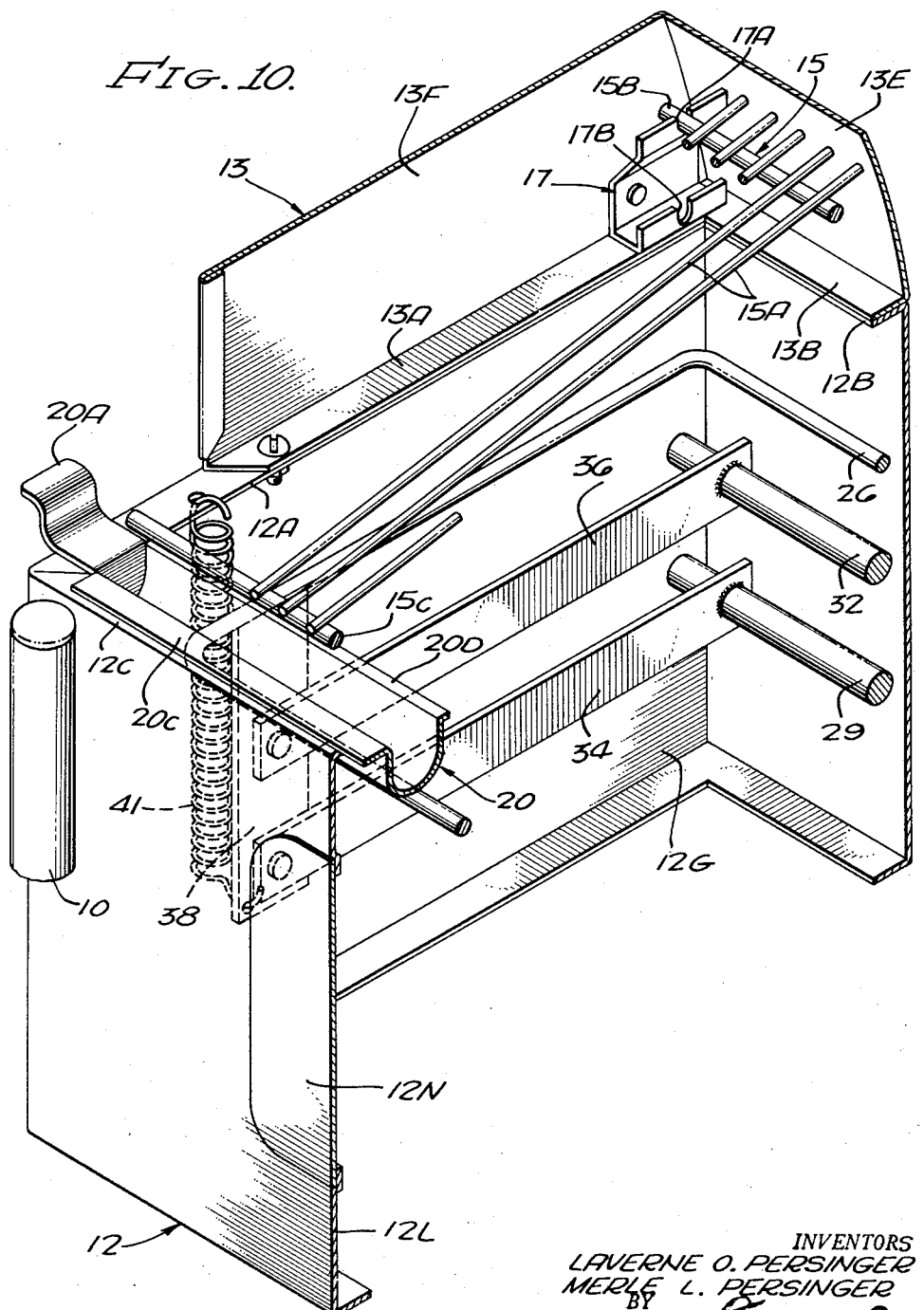
FIGURE 10 is a perspective view showing a portion of the barbecue illustrated in FIGURE 1.

Referring to the drawings, the barbecue is mounted on four legs 10 each having wheels 11 rotatably mounted on their lower ends for convenient transport. These legs 10 support a housing or frame which comprises generally a lower housing section 12 and an upper housing or hood section 13, the section 12 being bolted to the legs 10 and the upper section or hood 13 being bolted to the lower section 12. These two sections 12 and 13 are formed from sheet metal. The lower housing section 12 is formed generally as a rectangular box having, as shown in FIGURES 3, 4 and 10, inturned top edge portions 12A, 12B, 12C and 12D to provide a supporting structure for the other elements described hereinafter. The upper section 13 in the form of a hood or shield has lower inturned edge portions 13A, 13B and 13D resting on and bolted to corresponding inturned edge portions 12A, 12B and 12D of the lower section 12. The back wall 13E of the upper section 13 is curved slightly to aid in reflection of heat and to improve the general appearance of the barbecue assembly, while the side walls 13F and 13G extend generally vertically to define an open-ended box or shield structure allowing access to the grill 15.

The grill 15 comprises, as shown in FIGURE 10, a series of parallel spaced rods 15A which are welded near one of their ends to a first cross rod 15B and which are welded near their other ends to a second parallel extending cross rod 15C. The grill is supported in the following manner. The ends of the cross rod 15C are sufficiently prolonged so that such ends normally rest on the edge portions 12A and 12D of the housing section 12. In similar manner, the ends of the other cross rod 15B are sufficiently prolonged so as to be insertable in adjusted position in one of a pair of slotted portions in supporting brackets 17 (FIGURE 10) and 18 (FIGURE 3). These two brackets 17 and 18 are of preferably identical construction so that they may be interchanged and are bolted or riveted to the side walls of the upper housing or hood section 13. Since both brackets 17 and 18 are considered identical, it is sufficient only to describe the bracket 17 in detail. The bracket 17, as shown in FIGURE 10, has an upper slotted portion 17A and a lower slotted portion 17B both adaptable to receive the end of the grill cross rod 15B. The corresponding slotted portions in the bracket 18 are designated by the reference numerals 18A and 18B in FIGURE 3. It is observed that when the ends of the grill cross rod 15B are in the slotted portions 17A and 17B, the grill 15 is tilted in a downward and forward direction so that any grease or moisture on the grill rods 15A may gravitate downwardly towards the forward end and be collected in the grease tray 20. When the ends of the grill cross rod 15B are positioned in the apertured portions 17B and 18B, the plane of the grill is substantially horizontal.

The grease tray 20 is in the form of a shallow arcuate tray of sheet metal extending substantially the full width of the barbecue and is mounted below the grill rods 15A. For this purpose the grease tray 20 has integrally formed handle portions 20A and 20B at opposite ends thereof for convenient handling in removal and insertion of the removable tray 20. Normally such tray 20 has its handle portions 20A and 20B resting on the frame edge portions 12A and 12D and such tray is also provided with an integrally formed edge portion 20C resting on the frame edge portion 12C. Further, the tray 20 is provided with an outturned edge portion 20D upon which the grill cross rod 15C rests for providing a more stable support for the grill.

A firebox 25 adapted to retain burning charcoal C is provided for heating comestibles on the grill 15. This box 25 is in the form of a rectangular dish and is removable from the rectangular frame 26 upon which the outturned edges of the firebox 25 normally rest. This frame 26 is mounted on an adjustable parallelogram system described hereinafter whereby the firebox 25 may be conveniently raised and lowered to different adjusted positions while at all times maintaining the plane of the firebox 25 horizontal.

This parallelogram system is now described. The parallelogram system for moving the firebox to different adjusted positions includes a manually adjustable handle 27 which is loosely mounted as indicated in FIGURES 6 and 7 in spaced portions 28A and 28B of a U-shaped extension of a pivoted arm 28 which is welded to a rotatable rod 29, the rod or shaft 29 being rotatably supported as shown in FIGURE 8 by machine bolts 30 passing through such side walls and threaded in the ends of shaft 29. In other words, such machine bolts 30 may be considered to be an extension of the shaft 29 and provide means whereby the shaft 29 may be rotated on the opposite side walls of the housing 12. A second rod or shaft 32 of the parallelogram system is rotatably mounted on the spaced walls vertically above the shaft 29 in identical fashion using machine screws or rivets 30. The shaft 29 has welded thereto a second arm 34 which extends parallel to the arm 29. Similarly, a pair of parallel extending arms 35 and 36 are welded to the rotatable shaft 32. The free ends of arms 34 and 36, as shown in FIGURE 10, have pivotally mounted thereon a plate 38 having its upper end welded to the firebox rectangular frame member 26. Likewise, as shown in FIGURE 3, a similar plate 39 is pivotally mounted on the levers 28 and 35 and such plate 39 is welded to the rectangular firebox frame 26. It will be seen from this construction that up or down pivotal movement imparted to the lever 28 by the handle 27 results in movement of the firebox 25 with the plane of the firebox 25 at all times being horizontal so that the firebed is not disturbed by its movement.

Referring to FIGURES 6–9 and 1, the handle 27 comprises generally an elongated shaft which passes through an elongated slotted portion 28C and an enlarged apertured portion 28D in the lever portions 28A and 28B, respectively, and such handle is retained between the elements 28A and 28B by the flange 27A and the nut 27B on the handle. A bent leaf compression spring 40 (FIGURE 9) has its flat portion 40A bearing against the handle portion 28E and has its slotted portion 40B engaging the handle 27 so as to normally bias the handle 27 in its position illustrated in FIGURE 6 wherein, as shown in FIGURE 1, such handle 27 is resiliently pressed or biased into one of the downwardly extending slotted portions 12K formed in the front face 12L of the housing 12. Such slotted portions 12K are in communication with each other through a common vertical slotted portion 12M.

Thus, in adjusting position of the firebox, the handle 27 is moved slightly to the left in FIGURE 1 so that the handle may be moved vertically in the slotted portion 12M; and when such handle portion 27 is raised or lowered the desired amount, it is released whereupon the spring 40 presses the handle 27 into the adjacent slotted portion 12K. In order to facilitate adjustment of the firebox, a coil tension spring 41 (FIGURE 10) serving as a counterbalancing spring is provided. Such spring 41 has one of its ends hooked in an apertured portion of the casing edge portion 12A and the other one of its ends hooked in an apertured portion of the plate 38. Such spring 41 does not overcome all of the weight of the firebox and its lifting mechanism but only a part of the same so that said handle 27, as shown in FIGURE 1, is retained by gravity in one of the downwardly extending slotted portions 12K.

As explained above, the grill 15 has its forward edge normally resting on an edge portion of the drip tray 20. In order to remove the drip tray 20 the grill 15 may be raised manually to allow removal of the tray 20 or the grill 15 may be raised using the firebox lifting mechanism so as to position the grill 15 in its position indicated in dotted lines in FIGURE 4.

It will thus be seen from this construction that a simple inexpensive arrangement has been provided considering the features obtainable. These features include provision of an adjustable firebox which may be raised and lowered with respect to the grill and further, cooking may be accomplished with either the grill horizontal or tilted so that in the latter case grease drippings may gravitate into the grease tray 20 where they are collected without being burned. The construction also includes a door 12N pivoted on the front face of the case 12 so as to allow access to the firebox 25. Further, a conventional spit 42 is releasably mounted for rotation on the side walls of the upper casing or shield 13 and such spit 42 may be motor driven or provided simply with a handle as shown for convenient manual turning.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Barbecue equipment comprising in combination, a supporting frame, having a rear portion and a forward portion, a removable drip tray mounted on and extending laterally of said frame near the forward portion of said frame, vertically spaced grill supporting elements mounted near a rear portion of said frame, a grill having a rearward portion thereof engaging one of said elements and having a forward portion thereof resting on said tray to retain the same in position on said frame, said tray being disposed under the forward portion of said grill for collecting grease drippings, a firebox, parallelogram means on said frame for adjustably supporting said firebox in different vertically adjusted positions, said parallelogram means being operative to lift the firebox to move it in engagement with the grill and to lift the grill from said tray to allow removal of said tray and means for operating said parallelogram means to lift said grill.

2. Barbecue equipment comprising in combination, a supporting frame, said frame having a forward portion and a rear portion, bracket means mounted near said rear portion and having vertically spaced supporting elements thereon, a grill having a rear portion selectively engaging a selected one of said supporting elements for the angle of tilt of said grill may be adjusted, said grill comprising a plurality of parallel extending grill rods which extend generally downwardly and forwardly of the frame when said grill is held in tilted position by said elements, a drip tray removably mounted on the forward portion of said frame and extending laterally of said grill rods and beneath the same for collecting grease drippings, said drip tray being mounted on said frame for collecting grease drippings from the foremost ends of each rod and being contacted by said grill to retain said drip tray on said frame, a pair of vertically spaced shafts each rotatably supported near the rear of said frame, a pair of lever arms connected to corresponding ones of said shafts and extending forwardly of said frame, a firebox mounted on said lever arms for movement therewith, a manually movable handle extending forwardly of said frame and loosely connected to one of said arms, said frame having a vertically extending apertured portion in communication with a plurality of vertically spaced and laterally extending apertured portions, said handle being movable in said vertically extending apertured portion, spring means normally urging said handle in one of said laterally extending apertured portions, and means effective upon movement of said handle to an upper position to raise the firebox to a position where it contacts and raises said grill from said tray to allow removal of said tray.

References Cited in the file of this patent

UNITED STATES PATENTS

| | | |
|---|---|---|
| 541,534 | Haffcke | June 25, 1895 |
| 1,796,033 | Lee | Mar. 10, 1931 |
| 2,099,693 | Laffitte | Nov. 23, 1937 |
| 2,114,698 | Babin | Apr. 19, 1938 |
| 2,214,060 | McCormick | Sept. 10, 1940 |
| 2,460,125 | Carroll | Jan. 25, 1949 |
| 2,541,528 | McAvoy | Feb. 13, 1951 |
| 2,577,963 | Hagopian | Dec. 11, 1951 |
| 2,781,037 | Vuncannon | Feb. 12, 1957 |
| 2,812,706 | Del Francia et al. | Nov. 12, 1957 |

FOREIGN PATENTS

| | | |
|---|---|---|
| 3,969 | Great Britain | Feb. 21, 1896 |